Aug. 27, 1968  R. D. MITCHELL  3,398,838
REMOVABLE MECHANICAL SLUDGE COLLECTOR FOR
PACKAGE TYPE AEROBIC SEWAGE

Filed June 12, 1964  2 Sheets-Sheet 1

INVENTOR
Ryan D. Mitchell
BY
Cushman, Darby & Cushman
ATTORNEY

Aug. 27, 1968

R. D. MITCHELL 3,398,838

REMOVABLE MECHANICAL SLUDGE COLLECTOR FOR
PACKAGE TYPE AEROBIC SEWAGE

Filed June 12, 1964

INVENTOR
Ryan D. Mitchell

BY Cushman, Darby & Cushman
ATTORNEYS

United States Patent Office
3,398,838
Patented Aug. 27, 1968

3,398,838
REMOVABLE MECHANICAL SLUDGE COLLECTOR FOR PACKAGE TYPE AEROBIC SEWAGE
Ryan D. Mitchell, Thomasville, Ga., assignor to Davis Industries, Inc., Thomasville, Ga., a corporation of Georgia
Filed June 12, 1964, Ser. No. 374,593
10 Claims. (Cl. 210—531)

This invention relates to continuous mechanical clarification apparatus and more particularly to an improved rake carrying sludge collector for an activated sludge process, aerobic sewage treatment plant.

Generally, in aerobic sewage treatment utilizing activated sludge, the influent sewage after passing through bar screens which remove large floating objects such as broken boards, sticks and other debris, and through grit chambers in which the linear velocity of the sewage is reduced to a point such that gravel, cinders and like material drop out of the flow stream and are removed, and in some cases after further screening and sedimentation, passes to a long generally rectangular, tank having air diffusers located therein near the bottom of the tank. This tank, known as an aeration tank, supports growing, microscopic colonies of bacteria and protozoa which effect purification of the sewage producing biologically active sludge therein composed mainly of microbial protein. The sludge containing liquid is continuously discharged from the aeration tank to a clarifier whose purpose is to separate the sludge from the liquid. The liquid, which now has a low BOD, is drawn off for further processing or discharge as is to natural streams or the like. The activated sludge collected in the clarifier, and at least a portion thereof is continuously returned to the sewage entering the aeration tank at a predetermined ratio to the sewage, for instance 25 percent.

The sludge not needed to maintain this ratio is directed to a hold-up area from which it can be periodically withdrawn from the system and further processed for use as humus and fertilizer or fill.

The apparatus of the present invention relates to that portion of the just mentioned process wherein the effluent liquid is being separated from the activated sludge. Quite often this process step is carried out in an upright tank having a generally circular cross-section having an inlet from the aeration tank or tanks of the system entering at a point in the clarifier tank spaced considerably downwardly from the upper end thereof. The tank outlet is generally of the weir or launder type and is located near the upper end of the tank.

As the incoming sludge containing liquid enters the tank it is stilled to prevent breakup of the sludge particles. The substantial linear velocity decrease of the sludge bearing liquid upon emerging from the inlet conduit into the settling tank causes the solids (sludge) therein to settle to the bottom of the tank, whereas the clarified liquid is displaced upwardly over the weir or launders and is removed from the system.

It is necessary to continuously collect the settled sludge, compress entrapped liquid from it and return it proportionately to the aerator sewage influent and to humus, fertilizer or fill processing. Accordingly, clarifying or settling tanks are often provided with centrally disposed slowly rotating collectors which convey the settled sludge to a collecting point on the settling tank bottom from where it can be pumped as a thick slurry, or otherwise removed.

In the past, when it has been necessary to make repairs on one of these slowly rotating collectors such as inspecting and if necessary replacing conveying elements on the collectors, the sewage treating system has usually been disrupted by dewatering the settling tank so that the collector would be accessible.

This procedure is undesirable both from the standpoint that it takes a considerable amount of employee time to perform this maintenance work and because it removes sewage treating equipment from the operation for appreciable periods of time. This latter reason is especially important in sewage treatment plants of smaller communities which may not have sufficient standby equipment to continue treating all of the sewage while portions of their equipment are down for inspection and repair.

Accordingly, it is an important object of the present invention to provide an improved sludge collector for a continuously operable clarifier or settling tank, which can be quickly removed and replaced with facility without necessitating drainage of the tank or complete closedown of that portion of the sewage treatment operation for any appreciable period of time.

It will be seen that, while the apparatus of the present invention has particular application to relatively small volume sewage treatment operations such as are effected in prefabricated or "packaged," substantially self-contained, sewage treatment plants, it also can be used advantageously in somewhat larger operations and in similar environments to sewage treatment, such as in ore and pulp thickeners and other slurry clarification operations.

The above objects as well as other objects of the present invention are more fully set forth in the following detailed explanation of the structure and operation of a preferred embodiment of the apparatus of the invention which is illustrative of the principles thereof, reference being made to the attached drawings wherein a preferred embodiment is shown.

Figure 1:
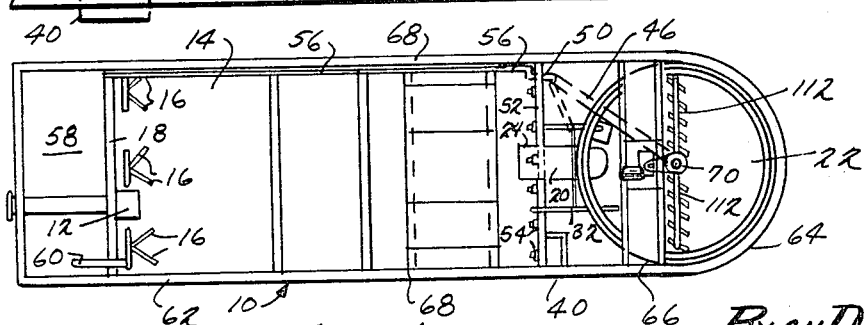
FIGURE 1 is a somewhat schematic top plan view of a compact, packaged sewage disposal system including a settling tank having a sludge collector illustrating the principles of the invention.
Figure 4:
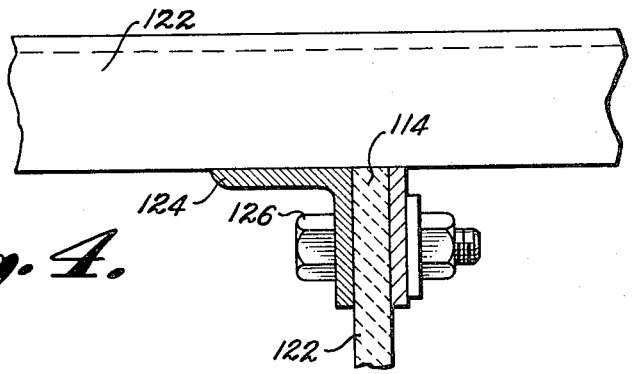
FIGURE 4 is an enlarged cross-sectional view through a removable scraper blade showing the mounting of the scraper arm.

Referring now more particularly to the figures, a generally self-contained sewage treatment plant is shown in FIGURE 1 at 10, and includes four major sections to be described hereinafter.

Suitably screened sewage enters the plant 10 through the generally horizontal inlet 12 approximately at the liquid level of the aeration tank 14. Air diffusers 16, fed by suitable air compressors are positioned near the bottom of the tank 14 at the inlet end 18 thereof and directed upwardly to establish a generally horizontal axis, clockwise circulation in the tank. A large diameter outlet 20 intermediate the opposite tank end from the inlet 12 connects the aeration tank 14 to the settling tank 22. Suitable stilling head means 24 are positioned outwardly of the outlet 20 and projecting into the aeration tank to reduce turbulence at this point as aforementioned. A generally annular vertically adjustable weir 26 having a plurality of "V" shaped serrations 28 along the upper surface thereof is positioned in a generally horizontal plane near the upper end of the settling tank 22 to control the liquid level therein. A generally annular scum baffle 30 coaxial with and spaced slightly radially inwardly from the weir 26 prevents scum from passing out of the settling tank as effluent. Instead, suitable suction skimming means 32 returns scum encircled by the baffle 30 to the aeration tank for reprocessing.

Liquid separated from sludge in the settling tank and passing over the weir 26 flows around a channel 34 and into the chlorine contact chamber 36 which is defined intermediate the generally rectangular aeration tank 14 and the generally upright cylindrical settling tank 22. In the chlorine contact chamber the liquid is chlorinated by means not forming a part of the present invention, and is discharged from the plant over the V notched weir 38 and out the outlet conduit 40.

The settling sludge is continuously moved by the collector 42, to be more fully described hereinafter to a sump 44 from which it is pumped through the conduit 46 which is located within the concrete filler 48 forming the bottom of the tank 22. The conduit 46 passes out of the tank 22 generally horizontally and into the chlorine contact chamber 36 whereupon it becomes generally vertically directed and terminates in a variable stream proportionating valve 50. At the valve 50 the sludge collected at the sump 44 is continuously divided into two portions. One portion, used to maintain the desired proportion of sludge to sewage in the aeration tank is conducted from the valve 50 through a conduit 52 to a plurality of spray nozzles 54 spaced along the conduit 52 and directed downwardly and away from the chlorine contact chamber to control froth formation in the aeration tank and aid maintaining the desired circulation pattern therein.

The other portion of the sludge divided at the valve 50 is conducted through a conduit 56 to a sludge holding tank 58 positioned near the plant inlet 12 from which it may be periodically removed. A suitable overflow weir 60 may be provided in the tank 58 to transfer sludge to the aeration tank if the sludge holding tank becomes filled to the level of the weir 60 before a regular removal period.

As best seen in FIGURE 1, each of the four abovementioned treatment areas 14, 22, 36 and 58 are in the packaged plant 10 as shown, enclosed within a common housing 62 having a generally rectangular shape with one curved end 64 encompassing the settling tank 22.

A cat walk or similar grating 66 is supported by the sidewalls 68 of the housing 62 so that it extends transversely of the housing and across the settling tank at a point thereon spaced toward the aeration tank 14 from the central vertical axis 70 of the settling tank 22.

An electric motor 72 is mounted on the grating adjacent the tank axis 70 to provide rotational motion for the novel collector 42. The motor 72 has reduction gearing means 74 coupled to the output shaft thereof with suitable overload torque sensing means (not shown) associated therewith for informing plant operators of resistance to rotation of the collector 42 above a predetermined threshold. Such an overload could be caused by an unusual rate of sludge settle-out or by a malfunction of portions of the collector 42 or other parts of the plant 10, and in any event is necessary to bring to the plant operator's attention, for instance by actuating a warning bell or lighting a light on the plant control board.

According to the present invention the collector 42 comprises a generally vertical shaft 76 having a longitudinally extending throughbore 78 and an enlarged lower end 80'. The throughbore 78 and enlarged lower end 80' are arranged to slidably receive a cooperatively configured pin 80 which projects upwardly from the center of the bottom 82 of the sump 44 and has a smoothly curved upper end 84.

Near its upper end the shaft 76 carries a sprocket 86 which is coupled to the reduction gearing means 74 of the motor 72 by an endless drive chain 88.

A short distance below the sprocket 86, a bearing 90 is mounted on the shaft 76. The bearing 90 preferably comprises an inner annular sleeve 92 which is keyed or otherwise secured to the shaft 76 and a surrounding sleeve 94 having a plurality of angularly spaced, longitudinally extending bolt holes 96 therethrough. According to the usage of the plant suitable anti-friction material such as grease, balls or rollers or the like may be enclosed in the annulus between the inner and outer sleeves 92, 94.

Figure 3:
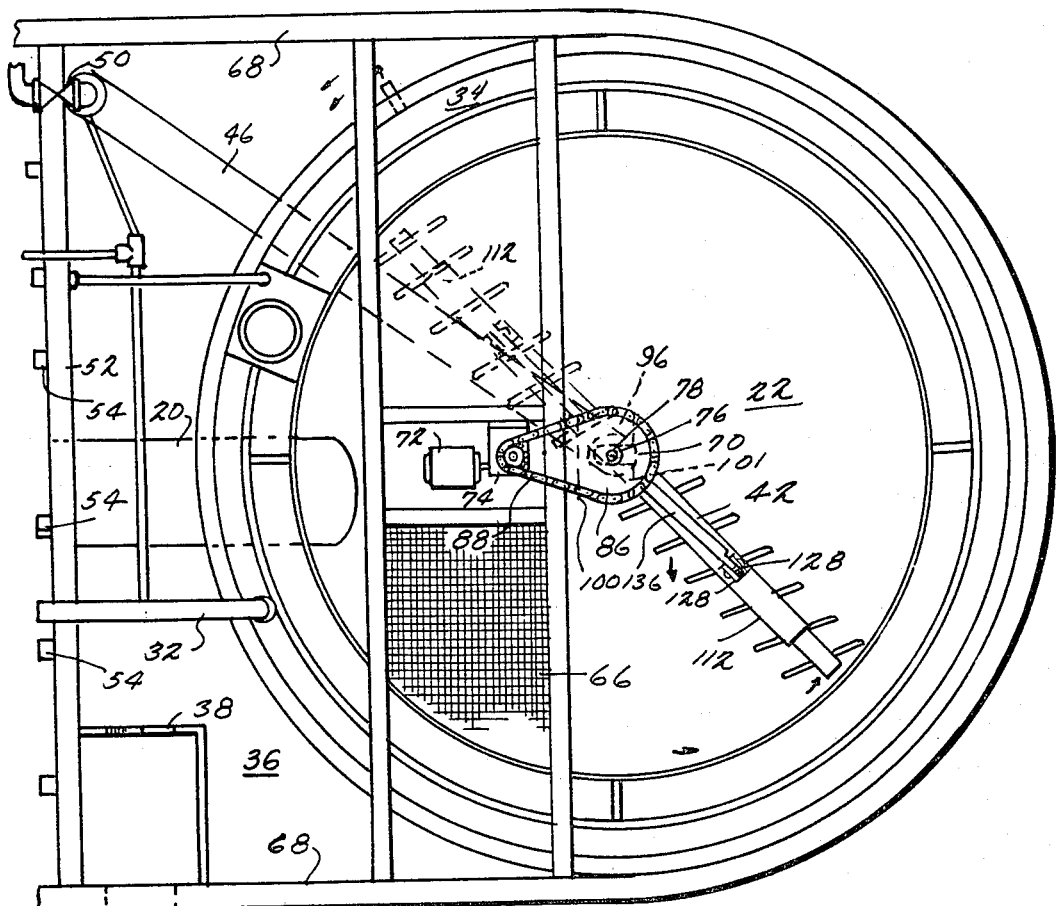
FIGURE 3 is a top plan view of the apparatus shown in FIGURE 2.
Figure 2:
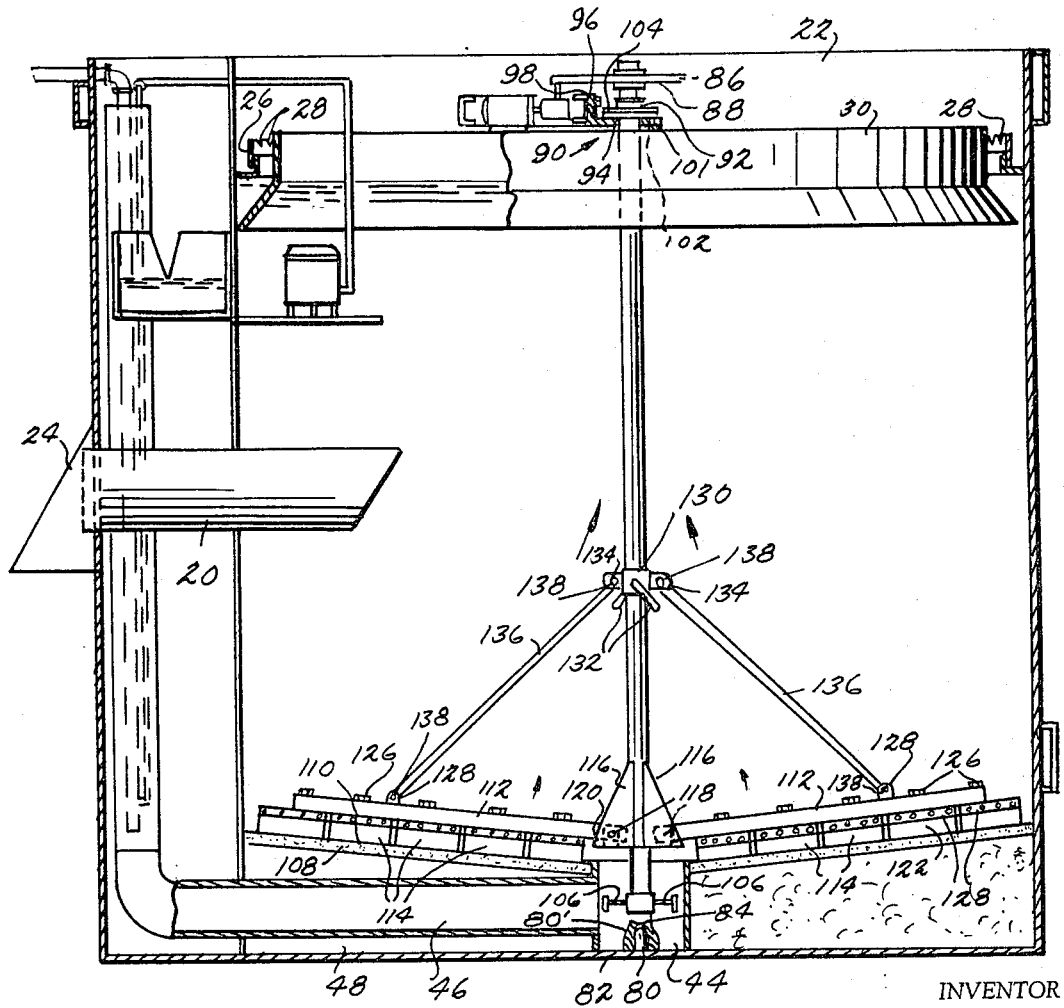
FIGURE 2 is a side elevation view of the settling tank portion of the apparatus of FIGURE 1 including an axially removable collector according to the invention, parts of the apparatus being shown in section to expose other portions thereof normally obscured.

As best seen in FIGURES 2 and 3, a generally L-sectioned support 96 is secured to the grating assembly 66 by the vertical leg 98 thereof so that its generally horizontal leg 100 projects toward the bearing 90. The horizontal leg 100 is bifurcated and each outer bifurcated portion 101 thereof is provided with bolt holes 102 which underlie and are longitudinally aligned with the bearing sleeve 94 holes. Suitable removable bolts 104 positioned in the aligned holes 96, 102 removably secure the shaft 76 in its upright, freely rotatable position.

Also mounted on the shaft 76 near the lower end thereof, at a point thereon normally within the sump 44 are a plurality of short, radially directed projections 106 which collectively act as an agitator or impeller within the sump to move sludge toward the conduit 46 of the sludge recirculating system.

The bottom of the sludge tank is preferably frustoconical, having its lower portion adjoining the sump to facilitate centralizing the sludge and depositing it in the sump 44.

As aforementioned the bottom of the settling tank 22 is preferably composed of cement or the like, and additionally a relatively thin layer 108 of grout may be carried upon the cement layer. To ensure a close sliding contact between the collector 42 and the grout 108, the latter may be swept in by the former prior to the start up of the plant.

The means for operating upon sludge which is settling to the grout surface 110 during the operation of the plant 10 comprises a pair of flight arms 112 connected to the shaft 76 which carry plow-like angularly directed rubber scrapers 114 in light frictionally engaging relationship with the surface 110.

The flight arms 112 are pivotally connected to the shaft through two pairs of oppositely directed, generally parallel and laterally spaced triangular pivot pin carrying wings 116. The wings extend from the shaft 76 at a point thereon just above the sump 44 and the pivot pins 118 thereon are quite close to the shaft so that the wide portions 120 of the wings strengthen the light weight collector considerably by transmitting torque between the arms 112 and the shaft 76.

Each of the scrapers 114 not only includes a rubber portion 122 urged against the grout surface 110, but also a holder 124 of metal or the like which retains the rubber portion 122 in place. Preferably the holders 124 are secured at radially spaced points on the arms 112 to depend from the lower sides thereof as by bolts 126 which can be individually loosened, repositioned and adjusted, both to provide for replacement of individual scrapers 114 or their rubber portions 122 and to allow selective angularity of the scrapers with respect to the arms 112.

Pairs of laterally spaced, upwardly projecting lugs 128 are mounted on the arms 112 intermediate their length and a slidable annular collar 130, having arresting means such as a pair of diametrically opposed hand set screws 132 thereon is positioned on the shaft 76. The collar 130 also carries two pairs of diametrically opposed spaced and generally radially directed lugs 134. A tie rod 136 is mounted as by pivotal nut and bolt assemblies 138 to extend between each lug pair 128 and 134.

Accordingly, it can be seen that by selectively positioning the collar 130 on the shaft 76 that the angle of the scraper carrying arms 112 can be varied. For instance when the collector 42 is to be removed from the tank 22 for inspection and repairs, the arms can be rotated upwardly to such a position that their radially outer ends are close to the shaft and the collector will present substantially less resistance to being lifted. During periods of high deposition of sludge, it may also be advantageous at times to move the arms 112 upwardly somewhat so that they are moving the uppermost portions of the sludge toward the sump rather than operating completely buried beneath heavy sludge.

As should now be apparent, the collector 42 can be easily and quickly removed from the tank 22 by removing the bolts 104 and sliding the bearing 90 laterally until it is free of the bifurcations 101. The drive chain 88 can then be removed from the sprocket 86, the arms 112 rotated upwardly if desired utilizing the hand set screws 132. The collector 42 can then be pulled up and out of the tank 22 by a plant operator on the cat walk 66. The whole collector assembly 42 or any parts thereof can then be repaired or replaced and the collector repositioned in the tank 22 in reverse process to the above.

It should now be apparent that the novel, light weight collector, preferably composed primarily of aluminum tubing, plate and extrusions and including adjustable scraper carrying arms efficiently accomplishes all of the objects of the invention and substantially increases the practical versatility of the plant in which it is incorporated.

Although a specific embodiment of the invention has been shown in the drawings and described hereinabove in order to more clearly illustrate the principles thereof, it should be understood that inasmuch as the illustrated embodiment can be considerably modified without departing from these principles, the present invention should be interpreted as encompassing all modifications within the spirit and scope of the following claims.

I claim:
1. In a sewage treating system having a sludge setting tank and a sludge sump positioned centrally of the tank at the bottom thereof, the improvement comprising: an easily removable rotary collector for continuously moving settling sludge from radially outer positions along the bottom of the tank to the sump thereof, the collector including a generally vertically directed rotatable shaft; means journalling said shaft at the lower end thereof in said sump, means mounting a motor adjacent said shaft near the upper end of the tank; a bearing mounted on said shaft adjacent said motor; means removably supporting said bearing with respect to the upper end of said tank, said means comprising a rigid elongated element extending transversely between and being supported upon the settling tank near the upper end of the tank and a generally horizontally extending bifurcated member partially encompassing said shaft, said bearing resting upon said bifurcated member peripherally of the bifurcation thereof; a plurality of generally radially extending arms pivotally mounted on said shaft intermediate the ends thereof for generally vertically directed pivoting movement; means on said shaft for arresting the position of said pivotable arms; and means on said arms for scrapingly engaging the bottom of said tank, said last mentioned means being positionable to collect sludge and move it toward said sump.

2. Apparatus as set forth in claim 1 wherein the scrapingly engaging means comprise a plurality of radially spaced, individually removable scrapers dependingly mounted on said arms.

3. Apparatus as set forth in claim 2 wherein the scrapers have replaceable rubber blades thereon.

4. Apparatus as set forth in claim 1 wherein the collector is primarily composed of light weight metal.

5. Apparatus as set forth in claim 4 wherein the light weight metal essentially comprises aluminum.

6. Apparatus as set forth in claim 1 wherein said bifurcated member includes means defining generally vertically directed bolt holes therethrough arranged to register with means defining bolt holes through said bearing, and said shaft is retained in place for rotation about its longitudinal axis by fastening means inserted in said bifurcated member and bearing bolt holes.

7. Apparatus as set forth in claim 1 additionally comprising gear reduction means coupled to said motor, a sprocket wheel fixed on said collector shaft near the upper end thereof and an endless drive chain coupling said gear reduction means to said sprocket wheel.

8. Apparatus as set forth in claim 1 wherein the arm pivoting arresting means comprises an annular collar mounted on the shaft; a plurality of connecting rods each pivotally connected at a first end thereof to said collar and at a second end thereof to one of the scraper carrying arms intermediate the extent of the arms.

9. Apparatus as set forth in claim 8 wherein the arresting means additionally comprises a pair of diametrically opposed hand set screws on said collar and arranged to frictionally engage said shaft.

10. Apparatus as set forth in claim 1 additionally comprising means projecting generally laterally from said shaft near the lower end thereof to agitate sludge within the sump.

References Cited

UNITED STATES PATENTS

| 867,958 | 10/1907 | Dorr | 210—531 |
| 1,007,954 | 11/1911 | Lamb | 210—528 |
| 2,279,970 | 4/1942 | Coe | 210—528 |
| 2,295,943 | 9/1942 | Finney | 210—531 |
| 2,783,891 | 3/1957 | Kunz et al. | 210—531 |

FOREIGN PATENTS

| 471,206 | 8/1937 | Great Britain. |
| 789,134 | 1/1958 | Great Britain. |

REUBEN FRIEDMAN, *Primary Examiner.*

J. DE CESARE, *Assistant Examiner.*